(12) United States Patent
Park

(10) Patent No.: US 9,292,042 B2
(45) Date of Patent: Mar. 22, 2016

(54) DISPLAY DEVICE

(75) Inventor: SangRyeon Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 74 days.

(21) Appl. No.: 13/280,089

(22) Filed: Oct. 24, 2011

(65) Prior Publication Data

US 2012/0099259 A1 Apr. 26, 2012

(30) Foreign Application Priority Data

Oct. 25, 2010 (KR) .......................... 10-2010-0103993

(51) Int. Cl.
*G06F 1/16* (2006.01)

(52) U.S. Cl.
CPC ............ *G06F 1/1601* (2013.01); *G06F 1/1637* (2013.01)

(58) Field of Classification Search
USPC .......................................... 361/679.21–679.3
See application file for complete search history.

(56) References Cited

U.S. PATENT DOCUMENTS

| | | | | |
|---|---|---|---|---|
| 6,177,971 B1* | 1/2001 | Jung | ............... | G02F 1/133308 349/58 |
| 6,848,800 B2* | 2/2005 | Kim | ............... | G02B 6/0031 362/149 |
| 7,397,461 B1* | 7/2008 | Graham | ............... | 345/156 |
| 7,423,878 B2* | 9/2008 | Kim | ............... | H05K 7/20963 345/905 |
| 7,492,421 B1* | 2/2009 | Kim | ............... | G02F 1/133308 349/58 |
| 7,692,732 B2* | 4/2010 | Tsubokura | ............... | G02F 1/133308 349/58 |
| 7,697,273 B2* | 4/2010 | Kawano | ............... | 361/679.21 |
| 2003/0095214 A1 | 5/2003 | Chen et al. | | |
| 2005/0094039 A1* | 5/2005 | Kim | ............... | G02F 1/133308 349/12 |
| 2005/0122019 A1 | 6/2005 | Bae | | |
| 2008/0088227 A1* | 4/2008 | Lee | ............... | 313/504 |
| 2008/0297998 A1* | 12/2008 | Choi | ............... | G06F 1/1601 361/679.02 |
| 2008/0297999 A1 | 12/2008 | Choi | | |
| 2009/0244433 A1* | 10/2009 | Ota | ............... | G02F 1/13476 349/58 |
| 2009/0303409 A1* | 12/2009 | Park | ............... | G02F 1/133308 349/58 |
| 2010/0245709 A1* | 9/2010 | Sugimori | ............... | G02F 1/13452 349/58 |

FOREIGN PATENT DOCUMENTS

| | | |
|---|---|---|
| CN | 1713248 A | 12/2005 |
| CN | 201527751 U | 7/2010 |
| JP | 2006-084757 A | 3/2006 |
| WO | WO 2010/024505 A1 | 3/2010 |

* cited by examiner

*Primary Examiner* — Zachary M Pape
*Assistant Examiner* — Douglas Burtner
(74) *Attorney, Agent, or Firm* — Birch, Stewart, Kolasch & Birch, LLP

(57) ABSTRACT

A display device includes a rear set cover, an upper end guide frame, a lower end guide frame, a panel, a first adhesive member, a second adhesive member, a panel driver, and a lower finishing material. The upper end guide frame is secured to an upper end portion inside the rear set cover, and coupled to the rear set cover. The lower end guide frame is secured to a lower end portion inside the rear set cover, and coupled to the rear set cover. The panel is secured to the upper end guide frame and lower end guide frame. The first adhesive member couples the upper end guide frame and panel. The second adhesive member couples the lower end guide frame and panel. The panel driver is placed inside the rear set cover, and drives the panel.

10 Claims, 5 Drawing Sheets

DISPLAY DEVICE

CROSS REFERENCE TO RELATED APPLICATIONS

This application claims the benefit of the Korean Patent Application No. 10-2010-0103993 filed on Oct. 25, 2010, which is hereby incorporated by reference as if fully set forth herein.

BACKGROUND

1. Field of the Invention

The present invention relates to a display device, and more particularly, to a display device, which has a minimized thickness by removing a portion of a case that was regarded as an essential element in producing the display device, and leads to the enhancement of a sense of beauty by applying an innovative design.

2. Discussion of the Related Art

Recently, Flat Panel Display (FPD) devices that can decrease a weight and a volume corresponding to the limitations of Cathode Ray Tubes (CRTs) are being developed. Liquid Crystal Display (LCD) devices, Plasma Display Panels (PDPs), Field Emission Display (FED) devices, and light emitting display devices are actively being researched as FPD devices. However, LCDs are easily manufactured, have drivability of drivers, realize a high-quality image, and thus are attracting much attention.

Recently, technical aspects of FDP devices are being researched and developed, and moreover, research and development are particularly being required on designs of products appealing to consumers.

Consequently, efforts are being continuously made for minimizing (i.e., slimming) the thicknesses of various display devices (for example, notebook computers, monitors, mobile devices, and televisions) using an FDP device, and research is increasingly conducted on a design with enhanced sense of beauty that can induce consumers to buy by appealing to the consumers' sense of beauty.

However, in design development for enhancing a scene of beauty or slimming of display devices that have been made to date, elements configuring a related art display device have been applied as is, and the structures of the elements have been changed. Due to these reasons, there are limitations in slimming display devices and developing the new designs of the display devices.

For example, a separate front set cover and rear set cover are additionally used for applying an FPD device to image display devices such as notebook computers, mobile devices, televisions.

As described above, display devices of the related art essentially include the front set cover and rear set cover, and consequently, there are limitations in reducing the thicknesses of LCD devices or changing the designs thereof.

Particularly, the front set cover covers a top edge of a display panel that displays an image. Consequently, the thicknesses of display devices inevitably become thicker, and moreover, the border widths of the display devices enlarge. In addition, it is difficult to realize various innovative designs due to a step height in a border portion.

To solve such limitations, borderless display devices are being recently developed where a border is not exposed in the front of each display device and a stepped portion is not formed therein.

FIG. 1 is an exemplary view illustrating a sectional surface of a related art borderless display device.

Referring to FIG. 1, the related art borderless display device has a configuration of a typical display device 10. However, a front surface of the related art borderless display device is covered with a tampered glass 50, and a boundary and a stepped portion are not formed in the front of the related art borderless display device.

To provide a detailed description on this, when an LCD device is used as the display device 10, the related art borderless display device of FIG. 1 includes a backlight unit 12 and a liquid crystal panel 11 identically to the display device 10. Also, in the related art borderless display device, a rear set cover for receiving the liquid crystal panel 11 has the same configuration as that of the display device 10, and the tampered glass 50 covers the entire front of the front set cover.

Therefore, a border and a stepped portion are not formed in the front of the related art borderless display device.

However, in the related art borderless display device, the tampered glass 50 covers the entire front, and thus, scratch occurs due to friction between the tampered glass 50 and the display device 10, causing the deterioration of brightness.

In the related art borderless display device, since the tampered glass 50 is disposed at the upper portion of the liquid crystal panel 11, light emitted from the liquid crystal panel 11 passes through a medium (i.e., the tampered glass 50), causing the deterioration of brightness. Furthermore, touch occurs in a gap between the lower surface of the tampered glass 50 and the upper surface of the liquid crystal panel 11, causing scratch.

SUMMARY

Accordingly, the present invention is directed to provide a display device that substantially obviates one or more problems due to limitations and disadvantages of the related art.

An aspect of the present invention is to provide a display device in which a display panel is exposed in a front surface of the display device, and a guide frame coupled to a rear set cover is joined to a rear surface of the display panel with an adhesive member.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a rear set cover; an upper end guide frame secured to an upper end portion inside the rear set cover, and coupled to the rear set cover; a lower end guide frame secured to a lower end portion inside the rear set cover, and coupled to the rear set cover; a panel secured to the upper end guide frame and lower end guide frame; a first adhesive member coupling the upper end guide frame and panel; a second adhesive member coupling the lower end guide frame and panel; a panel driver placed inside the rear set cover, and driving the panel; and a lower finishing material coupled to the lower end guide frame at a lower end portion of the panel, and supporting the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device according to embodiments of the present invention will be described in detail with reference to the accompanying drawings.

Figure 1:
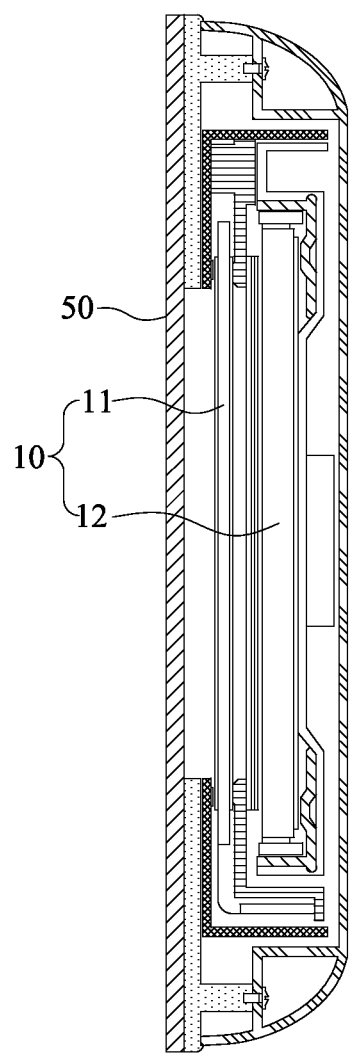
FIG. 1 is an exemplary view illustrating a sectional surface of a related art borderless display device.
Figure 2:
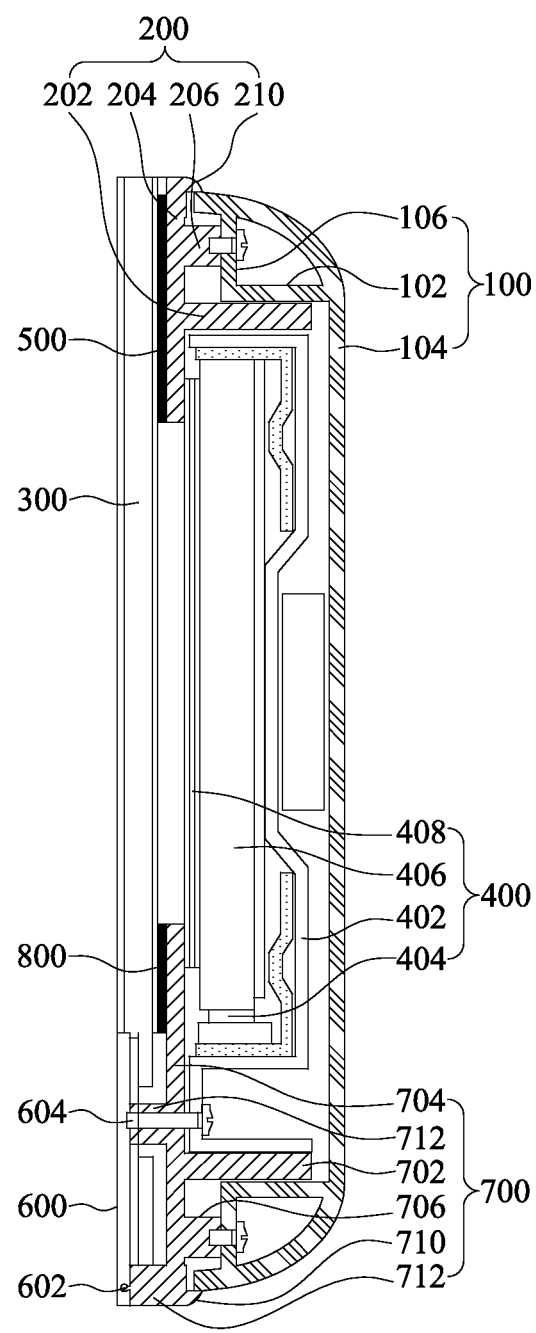
FIG. 2 is a sectional view illustrating a display device according to a first embodiment of the present invention.
Figure 3:
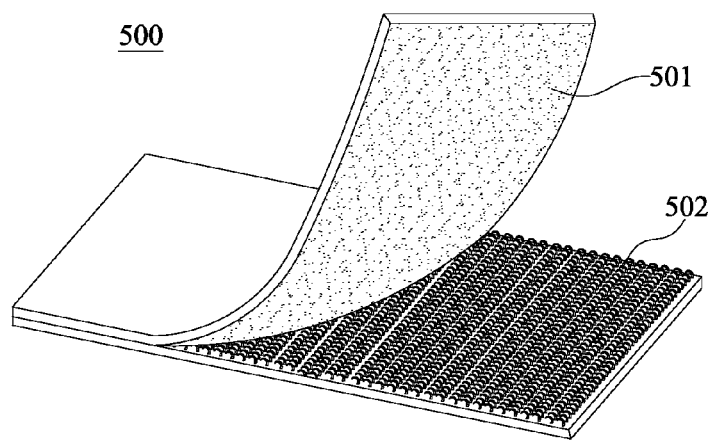
FIG. 3 is an exemplary view illustrating an adhesive member applied to embodiments of the present invention.

FIG. 2 is a sectional view illustrating a display device according to a first embodiment of the present invention. FIG. 3 is an exemplary view illustrating an adhesive member applied to embodiments of the present invention.

The display device according to the first embodiment of the present invention includes a rear set cover 100, an upper end guide frame 200, a panel 300, a panel driver 400, a first adhesive member 500, a lower finishing material 600, a lower end guide frame 700, and a second adhesive member 800.

The rear set cover 100 covers the outermost portion of a rear surface of the display device, and includes a rear set plate 104, a rear set inner wall 102, and a rear set coupling part 106.

The rear set plate 104 forms the outer appearance of the rear set cover 100, and may be formed in a rectangular shape. Alternatively, as illustrated in FIG. 2, the rear set plate 104 may be formed to have both rounded ends.

The rear set inner wall 102 is a plate that protrudes toward the panel 300 from an inner side of the rear set plate 104. The rear set inner wall 102 supports and guides the panel driver 400 and the guide frames 200 and 700.

The rear set coupling part 106 is a plate that protrudes from the inner side of the rear set plate 104 and is supported by the rear set inner wall 102. The rear set coupling part 106 couples the guide frames 200 and 700 to the rear set cover 100. For this end, a coupling groove is formed in the rear set coupling part 106. The rear set coupling part 106 and the guide frames 200 and 700 are coupled by a coupling means such as a screw that passes through the coupling groove. The rear set coupling part 106 and the guide frames 200 and 700 are coupled to each other, and thus, the guide frames 200 and 700 are secured to the rear set coupling part 106.

The rear set cover 100 supports and guides the panel 300, panel driver 400, and guide frames 200 and 700, and surrounds the entire rear surface of the display device.

Herein, the rear set cover 100 may be formed of a plastic material or a metal material, and particularly formed of a metal material for enhancing a sense of beauty.

The rear set inner wall 102 and rear set coupling part 106, as illustrated in FIG. 2, may be identically formed at an upper end portion and lower end portion of the display device, and coupled to the upper end guide frame 200 and lower end guide frame 700, respectively.

The upper end guide frame 200 is placed in a receiving space, prepared inside the rear set cover 100, to support the panel 300 and guide the panel driver 400, and formed at the upper end portion of the display device. To perform such functions, the upper end guide frame 200 includes an upper end guide side wall 202, an upper end panel supporting part 204, an upper end guide coupling member 206, and an upper end guide side coupling member 210.

The upper end guide side wall 202 is guided by the rear set inner wall 102, and formed vertically to a plane of the panel 300 and a plane of the rear set plate 104 to surround the side of the panel driver 400. That is, the upper end guide side wall 202 is inserted between the rear set inner wall 102 and panel driver 400 to surround and support the side of the panel driver 400. Also, the upper end guide side wall 202 may be fixed inside the rear set cover 100 by the rear set inner wall 102 and the side of the panel driver 400.

The upper end panel supporting part 204 is a plane that is formed vertically to the upper end guide side wall 202 at the distal end of the upper end guide side wall 202, and supports the panel 300. Herein, the width of the upper end panel supporting part 204 may be variously set in consideration of an image display area of the panel 300.

The upper end guide coupling member 206 couples the upper end guide frame 200 and upper end panel supporting part 204 to the rear set coupling part 106, and thus enables the upper end panel supporting part 204 to secure a fixed position in the rear set cover 100. For this end, the upper end guide coupling member 206 may be formed in various shapes such that the coupling means passing though the coupling groove of the rear set coupling part 106 is coupled thereto. For example, when the coupling means is a screw, an inserting groove with a thread formed therein is formed in the upper end guide coupling member 206, and thus, the upper end guide coupling member 206 and rear set coupling part 106 may be coupled by the screw inserted into the inserting groove.

The upper end guide side coupling member 210 is formed at one side end of the upper end panel supporting part 204, and surrounds a distal end of the rear set plate 104. Accordingly, a joint between the upper end panel supporting part 204 and the distal end of the rear set plate 104 adjacent to the panel 300 is covered naturally, and thus, a gap is not shown externally. Moreover, the upper end guide side coupling member 210 can prevent the distal end of the rear set plate 104 from moving when the distal end is not fixed. The distal end of the rear set plate 104 adjacent to the panel 300, as described above, may be formed in a round shape, in consideration of coupling with the upper end guide side coupling member 210.

The upper end guide side coupling member 210 forms a side of the display device, and may be formed in color similar to that of a side of the panel 300.

Subsequently, the panel 300 displays an image, and may be a liquid crystal panel or a plasma panel. Herein, the liquid crystal panel denotes only a part that substantially displays an image but does not include a backlight unit, in an LCD device. The plasma panel denotes only a part that substantially displays an image but does not include various driving circuits, in a PDP. In addition, the panel 300 may be a light emitting display panel having Organic Light Emitting Diodes (OLEDs).

That is, the panel 300 does not include various Printed Circuit Boards (PCBs) and backlights that are applied to various types of FPD devices (for example, LCD devices, PDPs, etc), and the panel 300 denotes only a part that substantially displays an image.

The panel driver 400 drives the panel 300 in order for an image to be displayed on the panel 300. When the display device is an LCD device, the panel driver 400 may be a backlight unit. Alternatively, when the display device is a PDP, the panel driver 400 may include various PCBs for driving a plasma panel. Hereinafter, a display device according to a first embodiment of the present invention will be described on the assumption of that the panel 300 is a liquid crystal panel and the panel driver 400 is a backlight unit. However, the present invention is not limited thereto, and each of the panel 300 and panel driver 400 may include various elements.

The backlight unit is mounted on a rear surface of the panel 300 and irradiates light toward the panel 300, thereby allowing the panel 300 to display an image. As illustrated in FIG. 2, the backlight unit may include a cover bottom 402, a light source 404, a light guide plate 406, and an optical sheet 400, and be implemented in various types.

The light guide plate 406 is formed in a flat type to have an incident surface, and travels light, which is incident from the light source 404 to the incident surface, toward the panel 300. Herein, the light source 404 may be configured with fluorescent lamps or Light Emitting Diodes (LEDs) and have various types.

The optical sheet 408 is disposed on the light guide plate 406, and enhances brightness characteristic of light that travels in a direction from the light guide plate 406 to the panel 300. For this end, the optical sheet 408 may include at least two of a lower diffusion sheet, lower prism sheet, upper prism sheet, and upper diffusion sheet.

In FIG. 2, the backlight unit is illustrated as having an edge type, but the first embodiment is not limited thereto. As an example, the backlight unit may be implemented in a direct type, in which case the backlight unit may have various elements.

Moreover, in FIG. 2, the panel driver 400 is illustrated as being separated from the panel 300 by the panel supporting part 204 for light diffusion and conformal brightness, but the first embodiment is not limited thereto. As an example, the panel driver 400 may not be separated from the panel 300.

A liquid crystal panel may be applied as the panel 300 that displays an image by the above-described backlight unit. The liquid crystal panel 300 is coupled to the panel supporting part 204 so as to be disposed on the backlight unit 400, and controls transmittance of light, irradiated from the backlight unit, to display an image.

The liquid crystal panel 300 may include a lower substrate, an upper substrate, a lower polarizer, and an upper polarizer.

The lower substrate includes a plurality of pixels (not shown) formed at respective areas where a plurality of gate lines (not shown) and data lines (not shown) intersect perpendicularly. Each pixel may include a thin film transistor (not shown) connected to a corresponding gate line and data line, a pixel electrode connected to the thin film transistor, and a common electrode that is formed adjacently to the pixel electrode and receives a common voltage. Herein, the common electrode may be formed at the upper substrate according to the driving type of a liquid crystal layer. In the lower substrate, an electric field is generated by a voltage difference between the common voltage and a data voltage applied to each pixel, and the light transmittance of the liquid crystal layer is controlled by the electric field, thereby displaying an image.

The upper substrate includes a plurality of color filters corresponding to respective pixels that are formed on the lower substrate, and is coupled to the lower substrate with the liquid crystal layer therebetween. At this point, a plurality of common electrodes that receive a common voltage according to a driving type of the liquid crystal layer may be formed on the upper substrate.

The first adhesive member 500 adheres and fixes the panel 300 to the panel supporting part 204. As illustrated in FIG. 3, the first adhesive member 500 may use a Velcro tape that has a first adhesive surface 501 formed of a prickly and rough cloth, and a second adhesive surface 502 formed of a smooth cloth. When the first and second adhesive surfaces 501 and 502 are coupled, a smooth cloth is tangled by a rough cloth, and thus, the Velcro tape can maintain a mutually coupled state unless a relative large external force is given thereto.

The first adhesive member 500 may use a double-sided tape, in addition to the Velcro tape. However, since the Velcro tape has better features than the double-side tape, the Velcro tape having the first and second adhesive surfaces 501 and 502 will be described below as an example of an adhesive member, in consideration of a manufacturing process.

In the embodiment, the first and second adhesive surfaces 501 and 502 are respectively adhered to a surface facing the upper end panel supporting part 204 and a surface facing the panel 300, and thus, the panel 300 is secured to the upper end panel supporting part 204.

The lower finishing material 600 covers a lower end of the panel 300 exposed to the outside. A lower end of the front surface of the display device has a border that is formed by the lower finishing material 600. The lower end guide frame 700 supports the lower finishing material 600 and panel 300, at the lower end of the display device. Herein, the term "lower finishing material" may be interchangeably used with the term "lower supporting material."

As illustrated in FIG. 2, the panel 300 is connected to the panel driver 400 or a separate driving PCB (hereinafter referred to as a driving circuit that is connected to the panel 300 for driving the panel 300 as in the panel driver 400 or driving PCB). For this end, various electric wirings are connected to the panel 300. Herein, the driving PCB may be included in the panel driver 400 or mounted on a separate position.

Therefore, various buttons or lamps for covering the electric wirings and driving the display device are required to be disposed in at least one of the upper, lower, left and right sides of the panel 300. The display device according to an embodiment of the present invention, as illustrated in FIG. 2, includes the lower finishing material 600 such that the electric wirings and elements are not exposed to the outside by covering a lower side and corner of the front surface of the panel 300.

However, the front surface of the lower finishing material 600 is formed not to be stepped with the front surface of the panel 300, and thus, the entire front surface of the display device is a plane.

When the panel 300 is a liquid crystal panel, as described above, the liquid crystal panel is configured with an upper substrate and a lower substrate, and as illustrated in FIG. 2, one side end of the upper substrate and one side end of the lower substrate are formed to have a stepped portion. Therefore, an upper end rear surface of the lower finishing material 600 is coupled to the stepped portion of the liquid crystal panel, and thus, electric wirings of the liquid crystal panel are not exposed to the outside.

In another embodiment of the present invention, a portion of a lower side of the liquid crystal panel faces an upper side of the lower finishing material 600, and thus, the panel 300 may be coupled to an upper side of the lower finishing material 600. In this case, another adhesive member having the same structure as that of the first adhesive member 500 may be used for adhesion between the upper side of the lower finishing material 600 and the lower side of the panel 300.

In such structure, the lower side of the panel 300 may be coupled and fixed to the upper side of the lower finishing material 600 with the other adhesive member having the same structure as that of the first adhesive member 500.

The lower finishing material 500 may be supported by the lower end guide frame 700 that is formed at a lower end portion of the display device.

Finally, the lower end guide frame 700 includes a lower end guide side wall 702, a lower end panel supporting part 704, a lower end guide coupling member 706, and a lower guide side coupling member 710, identically to the upper end guide frame 200. In addition, the lower end guide frame 700 may further include a lower finishing material supporting part 712.

Herein, the lower end guide side wall 702, lower end panel supporting part 704, lower end guide coupling member 706, and lower guide side coupling member 710 are respectively equal to the upper end guide side wall 202, upper end panel supporting part 204, upper end guide coupling member 206, and upper guide side coupling member 210 in function and structure, and thus, their detailed descriptions are not provided.

The lower end rear surface of the panel 300 may be adhered and fixed to the lower end panel supporting part 704 with a second adhesive member 800 having the same structure as that of the first adhesive member 500.

Except the elements, the lower finishing material supporting part 712 is formed only at the lower end guide frame 700 so as to support the lower finishing material 600, and as illustrated in FIG. 2, the lower finishing material supporting part 712 protrudes to a certain height from the lower end panel supporting part 704, for supporting the lower finishing material 600. However, the lower end finishing material supporting part 712 may be modified variously according to elements disposed between the lower finishing material 600 and lower end guide frame 700.

That is, in FIG. 2, the lower end finishing material supporting part 712 is illustrated as having two protrusion portions according to at least one element disposed between the lower finishing material 600 and lower end guide frame 700, but the embodiment is not limited thereto. The lower end finishing material supporting part 712 may be formed in various shapes.

The lower finishing material 600 and lower end guide frame 700 may be coupled to each other with a finishing material coupling means such as a screw 604, or coupled to each other with a finishing material coupling means such as a protrusion and a protrusion groove 602 that are formed at the lower finishing material 600 and lower end guide frame 700. Also, the lower finishing material 600 and lower end guide frame 700 may be coupled to each other with another adhesive member having the same structure as that of the first finishing member 500.

Figure 4:
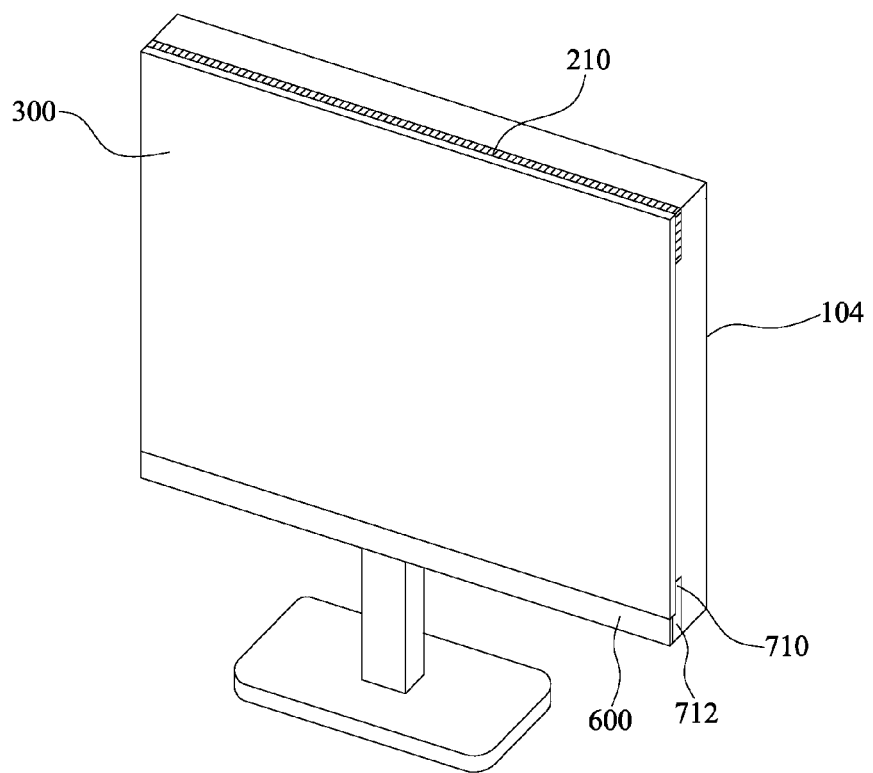
FIG. 4 is a perspective view illustrating a display device according to a first embodiment of the present invention.

FIG. 4 is a perspective view illustrating a display device according to a first embodiment of the present invention.

As illustrated in FIG. 4, in the display device according to the first embodiment of the present invention, only the panel 300 and lower finishing material 600 are exposed to a front surface of the display device, and a stepped portion is not formed at a connected portion between the panel 300 and lower finishing material 600. Accordingly, the entire front surface of the display device forms one plane.

In an upper end portion of the display device, the upper end guide frame 200 is coupled to the rear set plate 104 with the upper end guide coupling member 206 internally, in which state the upper end side coupling member 210 surrounds the rear set plate 104 and is exposed, externally.

Although not exposed to the outside, the upper end guide frame 200 is coupled to the panel 300 with the first adhesive member 500 that is adhered between the upper end panel supporting part 204 and panel 300.

In a lower end portion of the display device, the lower end guide frame 700 is coupled to the rear set plate 104 with the lower end guide coupling member 706 internally, in which state the lower end side coupling member 710 surrounds the rear set plate 104 and is exposed, externally.

The lower finishing material 600 is coupled to the lower finishing material supporting part 712 of the lower end guide frame 700, and the panel 300 is supported by the lower finishing material 600 and lower end guide frame 700 and coupled to the elements.

Accordingly, the display device according to the first embodiment of the present invention has a front surface that entirely forms one plane without a stepped portion, and the panel 300 displaying an image is exposed to the outside. Also, the display device according to the first embodiment of the present invention is covered by the lower finishing material 600 only at a portion of a lower end of the display device, and the lower finishing material 600 is coupled to the rear set plate 104 by the lower end guide frame 700.

Figure 5:
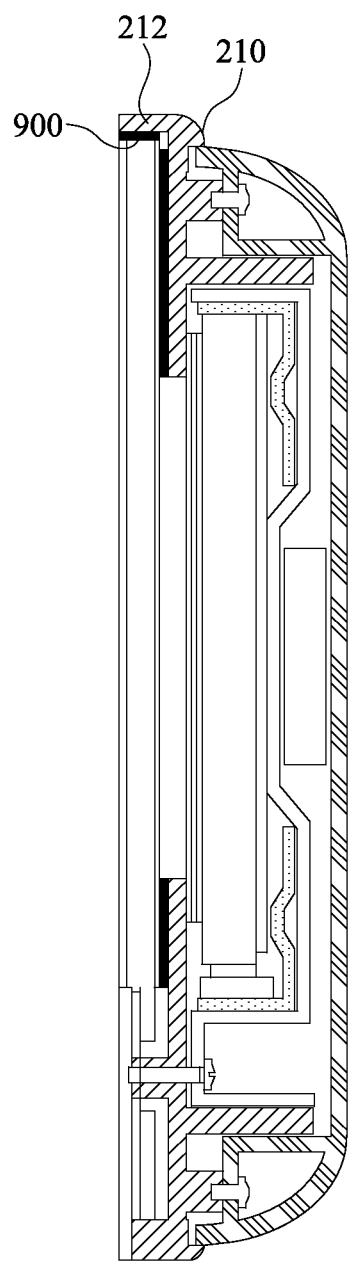
FIG. 5 is a sectional view illustrating a display device according to a second embodiment of the present invention.
Figure 6:
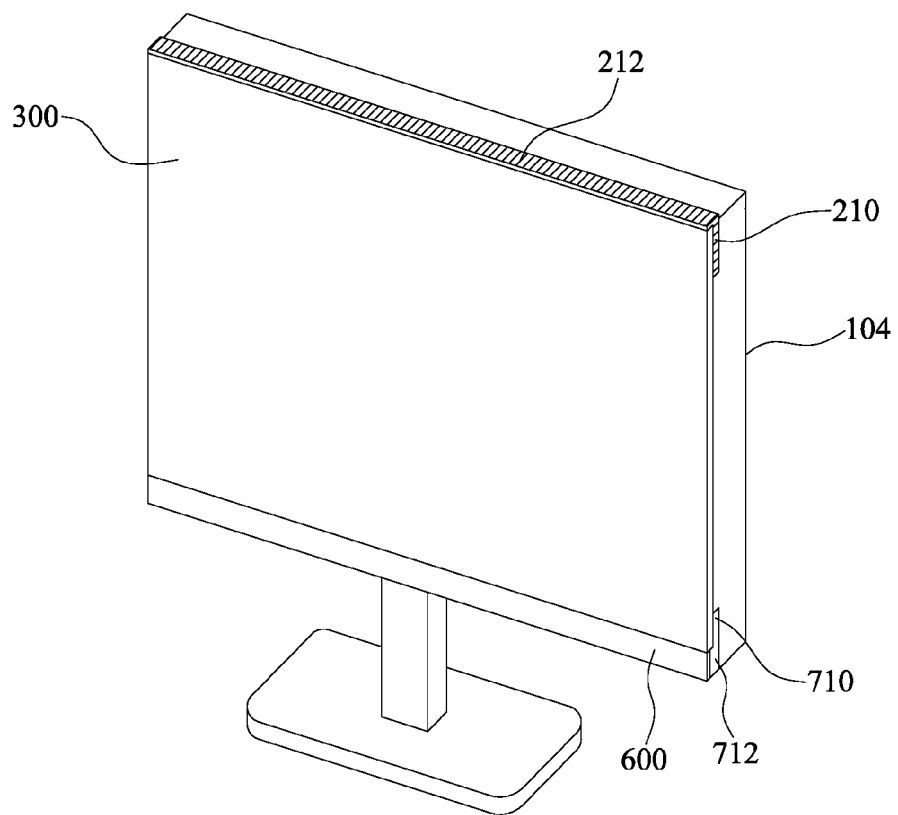
FIG. 6 is a perspective view illustrating a display device according to a second embodiment of the present invention.

FIG. 5 is a sectional view illustrating a display device according to a second embodiment of the present invention. FIG. 6 is a perspective view illustrating a display device according to a second embodiment of the present invention.<0}<0}

Comparing with the first embodiment of the present invention, the display device according to the second embodiment of the present invention includes an upper end panel guide 212 that is further formed in the upper end guide frame 200, and a third adhesive member 900 having the same structure as that of the first adhesive member 500 is disposed between the upper end panel guide 212 and an upper side of the panel 300 and couples the upper end panel guide 212 and the upper side of the panel 300. Except this structure, the first and second embodiments of the present invention are the same in structure.

In the second embodiment of the present invention, the upper end panel guide 212 that is bent from the upper end guide frame 200 is bent in a direction opposite to the upper end guide side coupling member 210, namely, a panel direction and thus guides and protects the upper side of the panel 300. The upper end panel guide may be coupled to the upper side of the panel 300 with the third adhesive member 900.

The upper end panel guide 212 surrounds the panel 300 along only the upper side of the panel 300, and thus, a stepped portion is not formed between the upper end panel guide 212 and the front surface of the panel 300 when seen from the front of the panel 300.

According to embodiments of the present invention, the display panel is exposed in the front surface of the display device, and the guide frame coupled to the rear set cover is joined to the rear surface of the display panel with the adhesive member, and thus, a front set cover is not provided.

According to embodiments of the present invention, the front set cover is not provided, thus saving the manufacturing cost.

According to embodiments of the present invention, the front set cover is not provided, and thus, the display device can decrease in weight.

According to embodiments of the present invention, the front set cover is not provided, thus reducing the number of processes.

According to embodiments of the present invention, by reducing the width of the border portion of the font surface and minimizing the step height, the display device having an innovative design with enhanced sense of beauty can be provided to consumers.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a rear set cover;
   an upper end guide frame secured to an upper end portion inside the rear set cover, and coupled to the rear set cover;
   a lower end guide frame secured to a lower end portion inside the rear set cover, and coupled to the rear set cover;
   a panel secured to the upper end guide frame and lower end guide frame;
   a first adhesive member coupling the upper end guide frame and the panel;
   a second adhesive member coupling the lower end guide frame and the panel;
   a panel driver placed inside the rear set cover, and driving the panel; and
   a lower supporting material coupled both with the lower end guide frame and with a lower end portion of the panel,
   wherein the lower supporting material supports the lower end portion of the panel in a manner that all of a front surface of the panel is exposed to the outside, and the lower supporting material is coupled with the lower end guide frame below the lower end portion of the panel, and
   wherein the lower end guide frame simultaneously supports both the panel and the lower supporting material, and
   wherein the upper end guide frame comprises:
   an upper end guide side wall supported by a rear set inner wall which protrudes from inside the rear set cover;
   an upper end panel supporting part supported by the upper end guide side wall, and supporting a rear surface of an upper end portion of the panel; and
   an upper end guide coupling member connected to the upper end panel supporting part, and coupled to the rear set cover at an inner side of the rear set cover.

2. The display device according to claim 1, wherein the rear set cover comprises:
   a rear set plate forming an outer appearance of the rear set cover;
   the rear set inner wall protruding from inside the rear set plate; and
   a rear set coupling part supported by the rear set inner wall, and coupled to the upper end guide frame or lower end guide frame.

3. The display device according to claim 1, wherein the upper end guide frame further comprises an upper end guide side coupling member extended from the upper end panel supporting part to surround an outer side of a distal end of the rear set cover.

4. The display device according to claim 1, wherein a stepped portion is not formed between a front surface of the lower supporting material and a front surface of the panel.

5. The display device according to claim 1, wherein a lower side of the panel is secured to an upper side of the lower supporting material.

6. The display device according to claim 5, further comprising another adhesive member disposed between the lower side of the panel and the upper side of the lower supporting material, and coupling the panel and lower supporting material.

7. The display device according to claim 1, wherein the lower end guide frame comprises:
   a lower end guide side wall supported by a rear set inner wall which protrudes from inside the rear set cover;
   a lower end panel supporting part supported by the lower end guide side wall, and supporting a rear surface of a lower end portion of the panel;
   a lower end guide coupling member connected to the lower end panel supporting part, and coupled to the rear set cover at an inner side of the rear set cover; and
   a lower supporting material supporting part protruding from the lower end panel supporting part for supporting the lower supporting material.

8. The display device according to claim 1, wherein the lower supporting material and lower end guide frame are coupled to each other by a supporting material coupling means.

9. The display device according to claim 1, wherein each of the first and second adhesive members is a Velcro tape.

10. The display device according to claim 3, wherein the upper end guide frame further comprises an upper end panel guide bent from the upper end panel supporting part to surround an upper side of the panel.

* * * * *